(12) United States Patent
Hwang

(10) Patent No.: US 8,818,077 B2
(45) Date of Patent: Aug. 26, 2014

(54) STEREO IMAGE MATCHING APPARATUS AND METHOD

(75) Inventor: Bon-Woo Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 439 days.

(21) Appl. No.: 13/327,410

(22) Filed: Dec. 15, 2011

(65) Prior Publication Data

US 2012/0155747 A1 Jun. 21, 2012

(30) Foreign Application Priority Data

Dec. 17, 2010 (KR) ........................ 10-2010-0130107

(51) Int. Cl.
*G06K 9/00* (2006.01)
*G06T 7/00* (2006.01)

(52) U.S. Cl.
CPC ..... *G06T 7/0075* (2013.01); *G06T 2207/10012* (2013.01)
USPC ....................................................... 382/154

(58) Field of Classification Search
None
See application file for complete search history.

(56) References Cited

U.S. PATENT DOCUMENTS

| 8,253,733 | B2 * | 8/2012 | Kim et al. | 345/419 |
|---|---|---|---|---|
| 8,538,159 | B2 * | 9/2013 | Lu | 382/195 |
| 2008/0049100 | A1 * | 2/2008 | Lipton et al. | 348/43 |
| 2012/0008857 | A1 * | 1/2012 | Choi | 382/154 |
| 2013/0051657 | A1 * | 2/2013 | Ostermann et al. | 382/154 |
| 2013/0287291 | A1 * | 10/2013 | Cho | 382/154 |

FOREIGN PATENT DOCUMENTS

KR 1020070061094 A 6/2007

OTHER PUBLICATIONS

Bleyer et al. (Sep. 2011) "PatchMatch Stereo: Stereo matching with slanted support windows." Proc. 2011 British Machine Vision Conf.*
Chang et al. (Jun. 2010) "Algorithm and architecture of disparity estimation with mini-census adaptive support weight." IEEE Trans. on Circuits and Systems for Video Technology. vol. 20 No. 6, pp. 792-805.*
De-Maetzu et al. (Jul. 2011) "Stereo matching using gradient similarity and locally adaptive support-weight." Pattern Recognition Letters vol. 32, pp. 1643-1651.*
Gerrits et al. (Jun. 2006) "Local stereo matching with segmentation-based outlier rejection." Proc. 3$^{rd}$ Canadian Conf. on Computer and Robot Vision, article 66.*
Gu et al. (2008) "Local stereo matching with adaptive support-weight, rank transform and disparity calibration." Pattern Recognition Letters, vol. 29 pp. 1230-1235.*

(Continued)

*Primary Examiner* — Barry Drennan

(57) ABSTRACT

The present invention relates to a stereo image matching apparatus and method. The stereo matching apparatus includes a window image extraction unit for extracting window images, each having a predetermined size around a selected pixel, for individual pixels of images that constitute stereo images. A local support-area determination unit extracts a similarity mask having similarities equal to or greater than a threshold and a local support-area mask having neighbor connections to a center pixel of the similarity mask, from each of similarity images generated depending on differences in similarity between pixels of the window images. A similarity extraction unit calculates a local support-area similarity from a sum of similarities of a local support-area. A disparity selection unit selects a pair of window images for which the local support-area similarity is maximized, from among the window images, and then determines a disparity for the stereo images.

16 Claims, 4 Drawing Sheets

(56) References Cited

OTHER PUBLICATIONS

Hosni et al. (Feb. 2013) "Secrets of adaptive support weight techniques for local stereo matching." Computer Vision and Image Understanding, vol. 117 pp. 620-632.*

Hosni et al. (Nov. 2009) "Local stereo matching using geodesic support weights." Proc. 16th IEEE Int'l Conf. on Image Processing, pp. 2093-2096.*

Hosni et al. (2010) "Near real-time stereo with adaptive support weight approaches." Proc. 2010 Int'l Symp. 3d Data Processing, Visualization and Transmission.*

Humenberger et al. (May 2010) "A fast stereo matching algorithm suitable for embedded real-time systems." Computer Vision and Image Understanding, vol. 114 pp. 1180-1202.*

Tombari et al. (Jun. 2008) "Classification and evaluation of cost aggregation methods for stereo correspondence." Proc. 2008 IEEE Conf. on Computer Vision and Pattern Recognition.*

Tombari et al. (2007) "Segmentation-based adaptive support for accurate stereo correspondence." LNCS 4872, pp. 427-438.*

Kuk-Jin Yoon et al., "Adaptive Support-Weight Approach for Correspondence Search", IEEE Transactions on Pattern Analysis and Machine Intelligence, Apr. 2006, pp. 650-656, vol. 28, No. 4, IEEE.

* cited by examiner

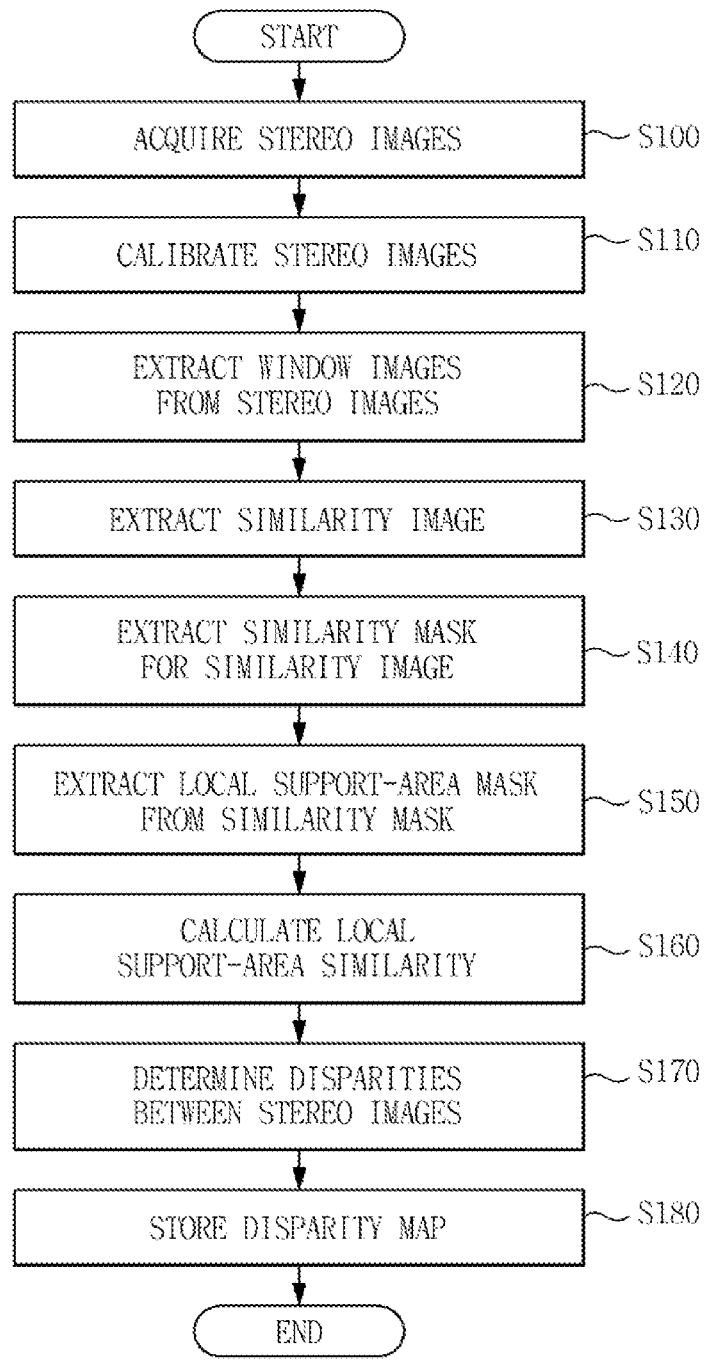

STEREO IMAGE MATCHING APPARATUS AND METHOD

CROSS REFERENCE TO RELATED APPLICATION

This application claims the benefit of Korean Patent Application No. 10-2010-0130107, filed on Dec. 17, 2010, which is hereby incorporated by reference in its entirety into this application.

BACKGROUND OF THE INVENTION

1. Technical Field

The present invention relates generally to a stereo image matching apparatus and method and, more particularly, to a stereo image matching apparatus and method, which generate an exact disparity map from stereo images using the maximum local support-area.

2. Description of the Related Art

The core purpose of stereo image matching technology is to obtain a disparity map for stereo images, and stereo images at that time are generally assumed to have undergone geometric camera calibration for two images. In this case, the range of search for disparities to find corresponding points is limited to one-dimensional (1D) horizontal Epipolar lines. However, typical matching between stereo images is problematic in that exact disparities cannot be calculated due to the difference in color and brightness between two images, the addition of noise, the occurrence of an overlap area, the existence of a repetitive pattern, the problem of boundary overreach on an object boundary, etc.

In particular, an adaptive window method that varies the size of a window or a multi-window method that utilizes windows having various sizes has been used to solve such object boundary overreach that occurs in the disparity map. However, it is very difficult to find an optimal window, and it is impossible to obtain the precise results only by matching object boundaries having random shapes using windows of a rectangular shape or another limited shape.

Meanwhile, a method of dividing images before matching the images has been proposed. However, it is very difficult to obtain precise division results for images having the complicated textures that frequently occur in ordinary images.

Therefore, an adaptive support-weight method in which weights proportional to distance to the color of the center of a window having a fixed size are assigned to the window, and a stereo matching method in which a geodesic support-weight method of adding connectivity from the center is applied to the adaptive support-weight method have been used. However, in an area having a fine repetitive pattern, a region having higher weights in the window is rapidly reduced, and thus a problem arises in that the matching discrimination ability decreases, and thus matching errors may increase.

Furthermore, an adaptive edge method that varies a window to be applied using edges has been attempted, but an additional task of extracting edges is required. In addition, when the size of a window is increased for the purpose of performing stable stereo matching against noise, the shape of edges becomes complicated. As a result, there is a disadvantage in that the number of windows that must be applied rapidly increases, thus causing the size of the windows to be limited.

SUMMARY OF THE INVENTION

Accordingly, the present invention has been made keeping in mind the above problems occurring in the prior art, and an object of the present invention is to provide a stereo image matching apparatus and method, which define a local support-area using the continuity of similarities between two comparison window images, extracted from respective images constituting stereo images, in relation to the connectivity to a center pixel, and obtain a pair of windows for which the sum of similarities between the pixels in the local support-area is maximized, thus determining disparities for the stereo images.

In accordance with an aspect of the present invention to accomplish the above object, there is provided a stereo image matching apparatus, including a window image extraction unit for extracting window images, each having a predetermined size around a selected pixel, for individual pixels of images that constitute stereo images captured by two or more cameras synchronized with one another, a local support-area determination unit for extracting a similarity mask having similarities equal to or greater than a threshold and a local support-area mask having neighbor connections to a center pixel of the similarity mask, from each of similarity images generated depending on differences in similarity between pixels of the window images, a similarity extraction unit for calculating a local support-area similarity from a sum of similarities of a local support-area determined by the local support-area mask, and a disparity selection unit for selecting a pair of window images for which the local support-area similarity is maximized, from among the window images, and then determining a disparity for the stereo images.

Preferably, each of the similarity images may have similarities calculated using differences in similarity between pixels of the window images.

Preferably, the local support-area determination unit may calculate the similarities from absolute differences or squared differences between the pixels of the window images.

Preferably, the local support-area determination unit may generate the similarity mask corresponding to the similarity image by assigning a value of '1' when each similarity is equal to or greater than the threshold, and a value of '0' when the similarity is less than the threshold.

Preferably, the local support-area determination unit may generate the local support-area mask corresponding to the similarity mask by assigning a value of '1' to pixels having neighbor connections to a center pixel of the similarity mask, among pixels having similarities equal to or greater than the threshold, and a value of '0' to pixels having no neighbor connection to the center pixel among the pixels.

Preferably, the local support-area determination unit may investigate neighbor connections between the center pixel of the similarity mask and other pixels by using a 4-neighbor connectivity technique or an 8-neighbor connectivity technique.

Preferably, the local support-area may be an area to which a value of '1' is assigned in the local support-area mask.

Preferably, the similarity extraction unit may calculate the local support-area similarity by summing up similarities in an area of the similarity image, corresponding to the local support-area.

In accordance with another aspect of the present invention to accomplish the above object, there is provided a stereo image matching method, including extracting window images, each having a predetermined size around a selected pixel, for individual pixels of images that constitute stereo images captured by two or more cameras synchronized with one another, extracting a similarity mask having similarities equal to or greater than a threshold and a local support-area mask having neighbor connections to a center pixel of the similarity mask, from each of similarity images generated depending on differences in similarity between pixels of the window images, calculating a local support-area similarity from a sum of similarities of a local support-area determined by the local support-area mask, and selecting a pair of window images for which the local support-area similarity is maximized, from among the window images, and then determining a disparity for the stereo images.

Preferably, each of the similarity images may have similarities calculated using differences in similarity between pixels of the window images.

Preferably, the extracting the local support-area mask may include calculating the similarities from absolute differences or squared differences between the pixels of the window images.

Preferably, the extracting the local support-area mask may further include assigning a value of '1' when each similarity is equal to or greater than the threshold, and assigns a value of '0' when the similarity is less than the threshold, thus generating the similarity mask corresponding to the similarity image.

Preferably, the extracting the local support-area mask may further include investigating neighbor connections between the center pixel of the similarity mask and pixels having similarities equal to or greater than the threshold, and generating the local support-area mask corresponding to the similarity mask by assigning a value of '1' to pixels having neighbor connection from the center pixel, and a value of '0' to pixels having no neighbor connection therefrom.

Preferably, the investigating the neighbor connection may be performed using a 4-neighbor connectivity technique or an 8-neighbor connectivity technique.

Preferably, the local support-area may be an area to which a value of '1' is assigned in the local support-area mask.

Preferably, the calculating the similarity may be configured to calculate the local support-area similarity by summing up similarities in an area of the similarity image, corresponding to the local support-area.

BRIEF DESCRIPTION OF THE DRAWINGS

The above and other objects, features and advantages of the present invention will be more clearly understood from the following detailed description taken in conjunction with the accompanying drawings, in which:

FIG. 4 is a flowchart showing the operating flow of a stereo image matching method according to the present invention.

DESCRIPTION OF THE PREFERRED EMBODIMENTS

Figure 1:
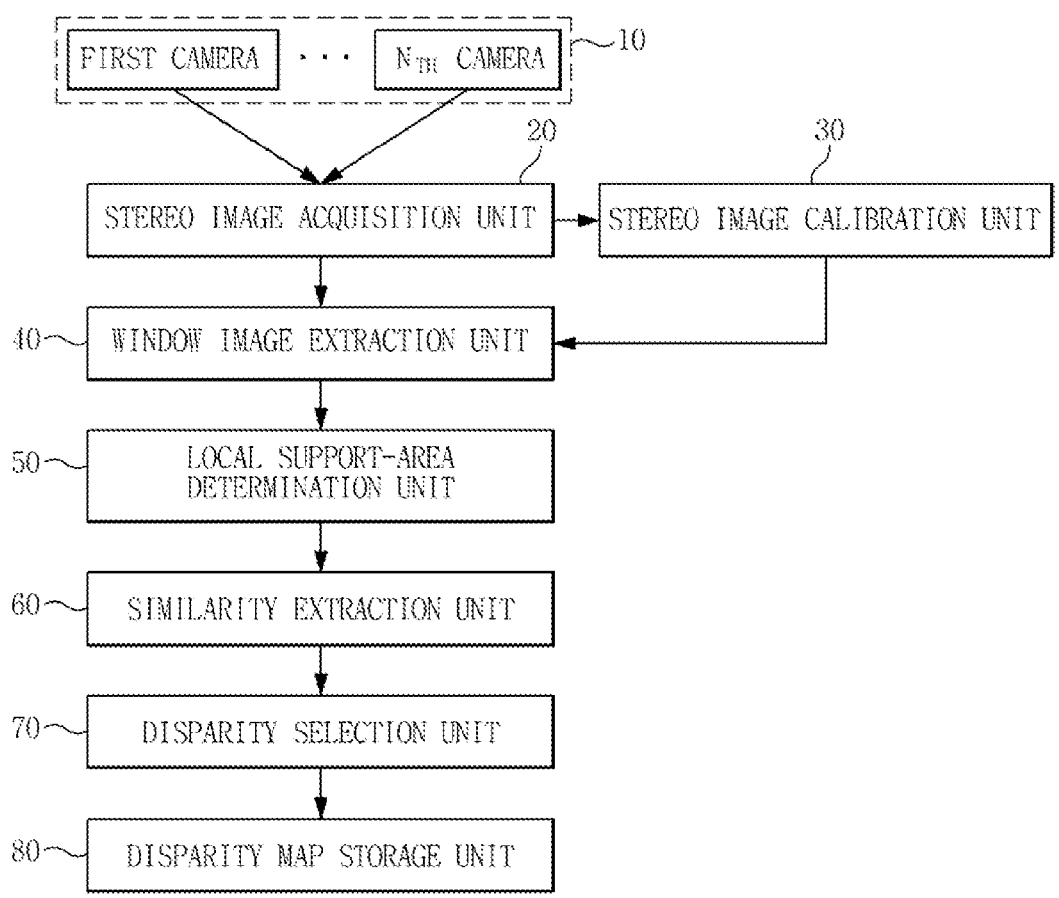
FIG. 1 is a block diagram showing the construction of a stereo image matching apparatus according to the present invention.

Reference now should be made to the drawings, in which the same reference numerals are used throughout the different drawings to designate the same or similar components.

Hereinafter, embodiments of the present invention will be described with reference to the attached drawings.

FIG. 1 is a block diagram showing the construction of a stereo image matching apparatus according to the present invention.

As shown in FIG. 1, a stereo image matching apparatus according to the present invention includes two or more cameras 10, a stereo image acquisition unit 20, a stereo image calibration unit 30, a window image extraction unit 40, a local support-area determination unit 50, a similarity extraction unit 60, a disparity selection unit 70, and a disparity map storage unit 80.

First, the two or more cameras 10 are operated in synchronization with one another.

The stereo image acquisition unit 20 acquires stereo images simultaneously captured by the two or more cameras 10. In this case, the stereo image acquisition unit 20 stores the stereo images in a storage means such as a hard disk or Random Access Memory (RAM).

The stereo image calibration unit 30 calibrates the stereo images acquired by the stereo image acquisition unit 20. The stereo image calibration unit 30 calibrates the stereo images using the camera intrinsic/extrinsic parameters of the cameras 10.

As an example, the stereo image calibration unit 30 performs a geometric transform on the stereo images so as to limit the range of search for disparities between the stereo images to an x axis (for horizontal stereo images) or a y axis (for vertical stereo images). The stereo image calibration unit 30 may be omitted from the construction of the present invention.

The window image extraction unit 40 extracts window images having a fixed size from the respective stereo images acquired by the stereo image acquisition unit 20 or the respective stereo images calibrated by the stereo image calibration unit 30.

In other words, the window image extraction unit 40 extracts color or gray window images, each having a fixed size of N×M around a selected pixel, for individual pixels within the search range on Epipolar lines from the respective stereo images.

Here, if it is assumed that points, obtained by projecting a point X in three-dimensional (3D) space relative to the centers of the respective cameras 10 onto respective images, are corresponding points, and that points at which a reference line for connecting the centers of the cameras 10 intersects the planes of the respective images are epipoles, lines for connecting the corresponding points and the epipoles are called epipolar lines.

The local support-area determination unit 50 extracts similarity images based on the differences in similarity between the pixels of the window images within the search range, and extracts a similarity mask and a local support-area mask from each similarity image.

In this case, the local support-area determination unit 50 calculates absolute differences or squared differences between the corresponding pixels of the respective window images. In this regard, the local support-area determination unit 50 assigns a lower similarity as the absolute difference or the squared difference between the pixels of the window images is larger, whereas it assigns a higher similarity as the absolute difference or the squared difference is smaller.

A formula for calculating similarities in relation to the differences between the pixels of the window images is given by the following Equation 1:

$$s(p_i^1, p_i^2) = e^{-\frac{d(p_i^1, p_i^2)^2}{\sigma^2}} \quad (1)$$

where $p_i^1$ and $p_i^2$ denote the $i_{th}$ pixels of a stereo image 1 and a stereo image 2, and $d=(p_i^1, p_i^2)$ denotes the difference between the $i_{th}$ pixels of the stereo image 1 and the stereo image 2. Further, $s(p_i^1, p_i^2)$ denotes a similarity between the $i_{th}$ pixels of the stereo image 1 and the stereo image 2. Therefore, the local support-area determination unit 50 generates the similarity image using the similarities between the pixels of the respective window images.

Meanwhile, when the similarities between the pixels of the stereo images are calculated using Equation 1, the local support-area determination unit 50 generates a similarity mask M for the similarity image by using the following Equation 2:

$$m(p_i) = \begin{cases} 1, & s(p_i^1, p_i^2) \geq \tau \\ 0, & \text{otherwise} \end{cases} \quad (2)$$

where $m(p_i)$ denotes the $i_{th}$ pixel value of the similarity mask M.

In this case, the local support-area determination unit 50 assigns a value of '1' to $m(p_i)$ when the similarity calculated for the $i_{th}$ pixel is equal to or greater than a threshold $\tau$. Further, the local support-area determination unit 50 assigns '0' to $m(p_i)$ when the similarity calculated for the $i_{th}$ pixel is less than the threshold $\tau$. In this way, the local support-area determination unit 50 generates the similarity mask M for the similarity image. An embodiment of the similarity mask M will be described with reference to FIG. 2.

Meanwhile, the local support-area determination unit 50 investigates neighbor connections between the center pixel P of the similarity mask M and pixels having similarities equal to or greater than the threshold. In this case, the local support-area determination unit 50 investigates neighbor connections to the center pixel P using a 4-neighbor connectivity technique or an 8-neighbor connectivity technique.

The local support-area determination unit 50 assigns a value of '1' to relevant pixels if relevant pixels having similarities equal to or greater than the threshold have neighbor connection to the center pixel, and it assigns a value of '0' to the pixels if the relevant pixels do not have a neighbor connection to the center pixel, thus generating a local support-area mask $M_r$. An embodiment of the local support-area mask $M_r$ will be described below with reference to FIG. 3.

The similarity extraction unit 60 calculates the sum of the similarities of the pixels in the local support-area of the local support-area mask $M_r$, that is, a local support-area similarity $S_r$. A formula used to calculate the local support-area similarity $S_r$ is represented by the following Equation 3:

$$S_r = \sum_{p_i \in p} s(p_i^1, p_i^2) m_r(p_i) \quad (3)$$

where $m_r(p_i)$ denotes the $i_{th}$ pixel value of the local support-area mask $M_r$.

As shown in Equation 3, the similarity extraction unit 60 calculates the local support-area similarity $S_r$ using the similarity image and the local support-area mask $M_r$. In this case, the similarity extraction unit 60 calculates the local support-area similarity $S_r$ by summing up the similarities of pixels corresponding to pixel values of '1' in the local support-area mask $M_r$.

The disparity selection unit 70 determines disparities between the stereo images by selecting a pair of window images, for which the local support-area similarity $S_r$ is maximized, from among the window images falling within the search range.

In other words, the disparity selection unit 70 determines disparities by selecting a window image having the highest local support-area similarity with respect to a window image extracted from the first image of the stereo images, from among window images extracted from other images within the search range.

The disparity map storage unit 80 stores the disparities selected by the disparity selection unit 70 as digital images. In this case, the disparity map storage unit 80 stores brightness images, which are generated by causing the brightness of the images to be changed to correspond to the disparities determined by the disparity selection unit 70, in the storage device.

Figure 2:
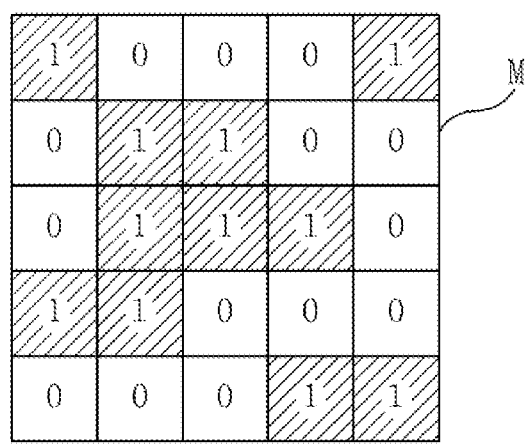
FIG. 2 is a diagram illustrating an embodiment of a similarity mask according to the present invention.

FIG. 2 is a diagram illustrating an embodiment of the similarity mask according to the present invention.

The local support-area determination unit calculates absolute differences or squared differences between the pixels of the window images, and then generates a similarity image depending on the differences in such a way as to assign a lower similarity as each difference is larger and to assign a higher similarity as the difference is smaller.

In this case, the similarity mask M is generated by assigning '1' when the similarity of the similarity image is equal to or greater than the threshold $\tau$ and assigning '0' when the similarity of the similarity image is less than the threshold $\tau$.

That is, it can be seen that in the similarity mask M of FIG. 2, an area assigned '1' is an area in which the corresponding pixels of the respective window images are similar to each other, and an area assigned '0' is an area in which the corresponding pixels of the respective window images are dissimilar to each other.

As an example, if it is assumed that a first window image and a second window image are present, each area assigned '1' in the similarity mask M of FIG. 2 indicates that the corresponding areas of the first window image and the second window image have similar pixel values. Meanwhile, each area assigned '0' indicates that the corresponding areas of the first window image and the second window image have dissimilar pixel values.

Figure 3:
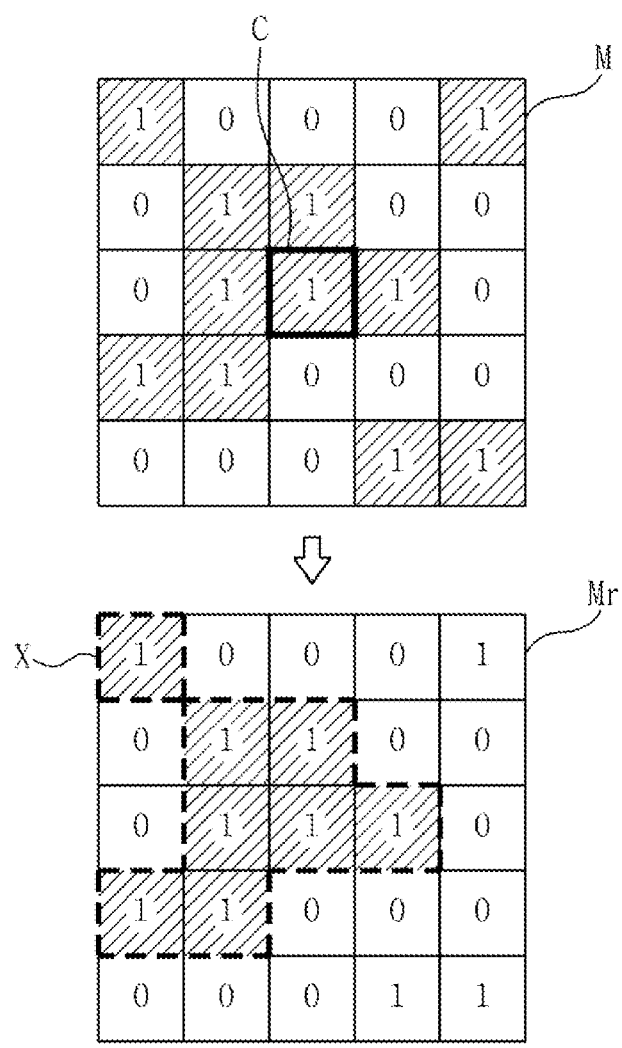
FIG. 3 is a diagram illustrating an embodiment of a local support-area mask according to the present invention.

FIG. 3 is a diagram illustrating an embodiment of the local support-area mask according to the present invention.

As shown in FIG. 3, the local support-area determination unit extracts a center pixel P from the similarity mask M generated in FIG. 2, and investigates neighbor connections between the center pixel P and pixels having similarities equal to or greater than the threshold, thereby generating a local support-area mask $M_r$ from the results of the investigation.

As an example, the local support-area determination unit investigates neighbor connections to the center pixel P using a 4-neighbor connectivity technique or an 8-neighbor connectivity technique.

In this case, the local support-area determination unit assigns '1' when the pixels having similarities equal to or greater than the threshold have neighbor connections to the center pixel, and it assigns '0' when those pixels do not have a neighbor connection to the center pixel.

In the similarity mask M of FIG. 3, a fifth pixel in a first row and fourth and fifth pixels in a fifth row have a pixel value of '1' that is identical to the value of the center pixel P, but they do not have a neighbor connection to the center pixel P. Accordingly, in the local support-area mask $M_r$, those pixels have a value of '0'.

Therefore, since a pixel having no neighbor connection in the local support-area mask $M_r$ has a similarity of '0', the similarity extraction unit calculates the local support-area similarity $S_r$ by summing up similarities present in the area 'X' having a neighbor connection.

FIG. 4 is a flowchart showing the operating flow of a stereo image matching method according to the present invention.

As shown in FIG. 4, the stereo image matching apparatus acquires stereo images simultaneously captured by two or more cameras 100 that are synchronized with one another at step S100, and calibrates the stereo images at step S110. Here, step S110 may be omitted.

Further, the stereo image matching apparatus extracts window images having a predetermined size from the stereo images, respectively, at step S120. For example, the stereo image matching apparatus extracts window images having a size of N×M.

At step S130, the stereo image matching apparatus extracts a similarity image from the window images extracted at step S120.

Here, the similarity image is an image to which similarities are assigned depending on the differences between the pixels of the respective window images. In this case, the stereo image matching apparatus assigns a lower similarity as a difference between the pixels of the window images is larger, and assigns a higher similarity as the difference between the pixels of the window images is smaller. These similarities can be calculated using the above Equation 1.

Meanwhile, the stereo image matching apparatus extracts a similarity mask based on the similarities assigned to the similarity image at step S140.

In this case, the stereo image matching apparatus assigns '1' to a relevant pixel when the similarity assigned to the relevant pixel of the similarity image is equal to or greater than a threshold, and assigns '0' to the relevant pixel when the similarity is less than the threshold. Therefore, the stereo image matching apparatus extracts the similarity mask having pixel values of '0' or '1'.

Thereafter, at step S150, the stereo image matching apparatus extracts a local support-area mask from the similarity mask extracted at step S140.

Here, the local support-area mask indicates neighbor connections between the center pixel of the similarity mask and pixels having similarities equal to or greater than the threshold. In other words, when the center pixel of the similarity mask has a value of '1', the local support-area mask indicates pixels having neighbor connections to the center pixel, among the pixels having a value of '1' in the similarity mask.

In this case, the stereo image matching apparatus assigns a value of '1' to pixels having neighbor connections to the center pixel of the similarity mask, among the pixels having similarities equal to or greater than the threshold, and assigns a value of '0' to pixels having no neighbor connection to the center pixel. Here, the local support-area mask is implemented such that only pixels having neighbor connections to the center pixel of the similarity mask have a value of '1' and the remaining pixels have a value of '0'. In the local support-area mask, the area in which pixel values are '1' is called a local support-area.

Therefore, the stereo image matching apparatus calculates a local support-area similarity by summing up the similarities of the similarity image corresponding to the local support-area at step S160.

The stereo image matching apparatus selects a pair of window images for which the local support-area similarity calculated at step S160 is maximized, from among the window images extracted at step S120, and then determines disparities between the stereo images at step S170.

Finally, at step S180, the stereo image matching apparatus stores a disparity map obtained based on the disparities determined at step S170, and terminates the operations of the method.

As described above, the present invention is advantageous in that matching enabling the similarity of a local support-area defined from a similarity image to be maximized is obtained regardless of the patterns of two window images, thus enabling disparities to be stably selected even in the case where fine patterns are repeated as well as the case where images having typical fine characteristics are present.

Further, the present invention is advantageous in that a local support-area is defined using the continuity of similarities between two comparison window images, extracted from respective images constituting stereo images, in relation to connectivity to a center pixel, and a pair of window images for which the sum of similarities between the pixels in the defined local support-area is maximized is obtained, so that the exactness of a disparity map for stereo images having various types of textures, as well as repetitive patterns, can be improved.

Although the preferred embodiments of the stereo image matching apparatus and method according to the present invention have been disclosed for illustrative purposes with reference to the attached drawings, those skilled in the art will appreciate that the present invention is not limited by the embodiments and drawings, and various modifications, additions and substitutions are possible, without departing from the scope and spirit of the invention.

What is claimed is:

1. A stereo image matching apparatus, comprising:
 a window image extraction unit for extracting window images, each having a predetermined size around a selected pixel, for individual pixels of images that constitute stereo images captured by two or more cameras synchronized with one another;
 a local support-area determination unit for extracting a similarity mask indicating similarities equal to or greater than a threshold in a similarity image generated based on similarities calculated from differences between pixels of the window images, and for generating a local support-area mask indicating pixels of the similarity mask having neighbor connections to the center pixel of the similarity mask;
 a similarity extraction unit for calculating a local support-area similarity from a sum of the similarities of a local support-area determined by the local support-area mask; and
 a disparity selection unit for selecting a pair of window images for which the local support-area similarity is maximized, from among the window images, and then determining a disparity for the stereo images based on the selected window images.

2. The stereo image matching apparatus of claim 1, wherein each of the similarity images has similarities calculated using differences between pixels of the window images.

3. The stereo image matching apparatus of claim 2, wherein the local support-area determination unit calculates the similarities from absolute differences or squared differences between the pixels of the window images.

4. The stereo image matching apparatus of claim 2, wherein the local support-area determination unit extracts the similarity mask corresponding to the similarity image by assigning to pixels of the similarity mask a value of '1' when the corresponding similarity is equal to or greater than the threshold, and a value of '0' when the corresponding similarity is less than the threshold.

5. The stereo image matching apparatus of claim 1, wherein the local support-area determination unit generates the local support-area mask corresponding to the similarity mask by assigning a value of '1' to pixels of the local support-area mask having neighbor connections to the center pixel of the similarity mask, among the pixels having similarities equal to or greater than the threshold, and a value of '0' to pixels having no neighbor connection to the center pixel among the pixels having similarities equal to or greater than the threshold.

6. The stereo image matching apparatus of claim 5, wherein the local support-area determination unit investigates neighbor connections between the center pixel of the similarity mask and other pixels by using a 4-neighbor connectivity technique or an 8-neighbor connectivity technique.

7. The stereo image matching apparatus of claim 5, wherein the local support-area is an area to which a value of '1' is assigned in the local support-area mask.

8. The stereo image matching apparatus of claim 7, wherein the similarity extraction unit calculates the local support-area similarity by summing up similarities in an area of the similarity image, corresponding to the local support-area.

9. A stereo image matching method, comprising:
   extracting window images, each having a predetermined size around a selected pixel, for individual pixels of images that constitute stereo images captured by two or more cameras synchronized with one another;
   extracting a similarity mask indicating similarities equal to or greater than a threshold in a similarity image generated based on similarities calculated from differences between pixels of the window images, and generating a local support-area mask indicating pixels of the similarity mask having neighbor connections to the center pixel of the similarity mask;
   calculating a local support-area similarity from a sum of the similarities of a local support-area determined by the local support-area mask; and
   selecting a pair of window images for which the local support-area similarity is maximized, from among the window images, and then determining a disparity for the stereo images based on the selected window images.

10. The stereo image matching method of claim 9, wherein each of the similarity images has similarities calculated using differences between pixels of the window images.

11. The stereo image matching method of claim 10, wherein the extracting the local support-area mask comprises calculating the similarities from absolute differences or squared differences between the pixels of the window images.

12. The stereo image matching method of claim 10, wherein the extracting the local support-area mask further comprises generating the similarity mask corresponding to the similarity image by assigning to pixels of the similarity mask a value of '1' when the corresponding similarity is equal to or greater than the threshold, and a value of '0' when the corresponding similarity is less than the threshold.

13. The stereo image matching method of claim 9, wherein the extracting the local support-area mask further comprises:
   investigating neighbor connections between the center pixel of the similarity mask and pixels having similarities equal to or greater than the threshold; and
   generating the local support-area mask corresponding to the similarity mask by assigning a value of '1' to pixels of the local support-area mask having neighbor connections to the center pixel, and a value of '0' to pixels having no neighbor connection to the center pixel.

14. The stereo image matching method of claim 13, wherein the investigating the neighbor connections is performed using a 4-neighbor connectivity technique or an 8-neighbor connectivity technique.

15. The stereo image matching method of claim 13, wherein the local support-area is an area to which a value of '1' is assigned in the local support-area mask.

16. The stereo image matching method of claim 15, wherein the calculating the similarity is configured to calculate the local support-area similarity by summing up similarities in an area of the similarity image, corresponding to the local support-area.

\* \* \* \* \*